(12) United States Patent
Andersson et al.

(10) Patent No.: US 6,407,522 B1
(45) Date of Patent: Jun. 18, 2002

(54) METHOD AND A DEVICE FOR CONTROLLING THE OPERATION OF AN ACTUATOR UNIT

(75) Inventors: Jörgen Andersson, Bjärred; Örjan Christoffersson, Lund; Anders Helmner, Bjärred; Kenneth Nilsson, Tomelilla, all of (SE)

(73) Assignee: Telair International AB, Lund (SE)

( * ) Notice: Subject to any disclaimer, the term of this patent is extended or adjusted under 35 U.S.C. 154(b) by 0 days.

(21) Appl. No.: 09/664,049

(22) Filed: Sep. 18, 2000

(51) Int. Cl.[7] .................................................. H02P 1/04
(52) U.S. Cl. ........................ 318/430; 318/432; 318/434
(58) Field of Search .............................. 193/35 A, 35 R; 244/118.1, 137.1; 414/507, 518; 318/430–434

(56) References Cited

U.S. PATENT DOCUMENTS

| | | | |
|---|---|---|---|
| 4,394,607 A | | 7/1983 | Lemirande |
| 4,701,684 A | | 10/1987 | Seidel et al. |
| 4,805,852 A | * | 2/1989 | Nordstrom ............... 244/137.1 |
| 4,984,756 A | | 1/1991 | Anders ..................... 244/137.1 |
| 5,170,968 A | * | 12/1992 | Helmner ................... 244/137.1 |
| 5,543,692 A | | 8/1996 | Howie et al. |
| 5,719,732 A | * | 2/1998 | Nagahama et al. ......... 318/434 |
| 5,729,104 A | | 3/1998 | Kamishima et al. |
| 6,046,893 A | * | 4/2000 | Heravi ....................... 318/434 |
| 6,166,502 A | * | 12/2000 | Pattok et al. ............... 318/434 |

FOREIGN PATENT DOCUMENTS

DE        199 01 840 A1     5/2000

* cited by examiner

Primary Examiner—Marlon T. Fletcher
(74) Attorney, Agent, or Firm—Burns, Doane, Swecker & Mathis, LLP (57) ABSTRACT

The invention concerns a method for controlling the operation of an actuator unit, comprising the steps: a) repeatedly reading the current fed to the actuator unit, b) a first comparison wherein the readings are compared with a first maximum level and if the readings are above the maximum level the electrical power fed to the actuator unit is cut off, c) a second comparison wherein two successive readings repeatedly are compared with each other and if the differences between the readings are below a first ramp level a number a steady state condition for the current fed to the actuator unit is detected, and d) if steady state is detected setting at least one overload detection limit on basis of a steady state reading of the current fed to the actuator unit. The invention also concerns a device for carrying out the method and a conveyor incorporating the device.

23 Claims, 6 Drawing Sheets

METHOD AND A DEVICE FOR CONTROLLING THE OPERATION OF AN ACTUATOR UNIT

BACKGROUND OF THE INVENTION

The present invention is related to a method and a device for controlling an actuator unit, in particular to an actuator unit for a conveyor, and more particularly to an actuator unit for a conveyor for loading of a cargo compartment, in particular that of an aircraft fuselage. Such a loading conveyor or sliding carpet system is described in U.S. Pat. No. 4,984,756 (Helmner), which hereby is incorporated by reference.

The loading system is located beneath the passenger cabin and comprises a carpet-like conveyor, driven by an actuator unit via belts connected to the conveyor. A rear cargo wall is fixed to the belts and provides a rear storage room limit.

The loading system is used in the loading mode as follows:

The actuator unit is achieved and drives the rear wall to the front of the loading system.

One layer of suitcases or similar cargo is put down on the carpet-like conveyor.

The actuator unit is activated and drives the conveyor and the rear wall about half a meter backwards.

A new layer of cargo is put down on the conveyor and the actuator unit is again activated and the conveyor is loaded with another layer of cargo stepwise, until the conveyor is fully loaded, i.e. when the rear wall is at its most rearward position.

When the loading conveyor is to be unloaded the procedure is performed the other way around. The loading conveyor is stepwise unloaded and stepwise driven by the actuator unit until it is completely emptied, i.e. when the rear wall is in its most forward position.

The actuator (motor and gearbox) of the sliding carpet system typically consists of a three-phase electrical asynchronous motor connected to a reduction gear, e.g. a planet reduction gear. The rotational speed and torque of the actuator is dimensioned to handle/stand up to the highest specified baggage weight (maximum load) of the loading system. Also the electric system is dimensioned on basis of the maximum current consumption required by the actuator (asynchronous motor) at this maximum load.

The motor is protected by electric fuses or circuit breakers, which are blown or released at too high current, i.e. if the motor torque exceeds the maximum load. The fuses that protect the motor, the electric cables and other electric components are dimensioned on the basis of said maximum load of the conveyor. To protect the mechanical components, the movable bulkhead has release connections, which are released if the bulkhead hits a stop. These release connections must, after they have been released, be restored manually, which is a problem. It takes time, the sliding carpet must be unloaded manually, mechanics are to be called, and the function is only optimal in some loading cases.

Figure 2:
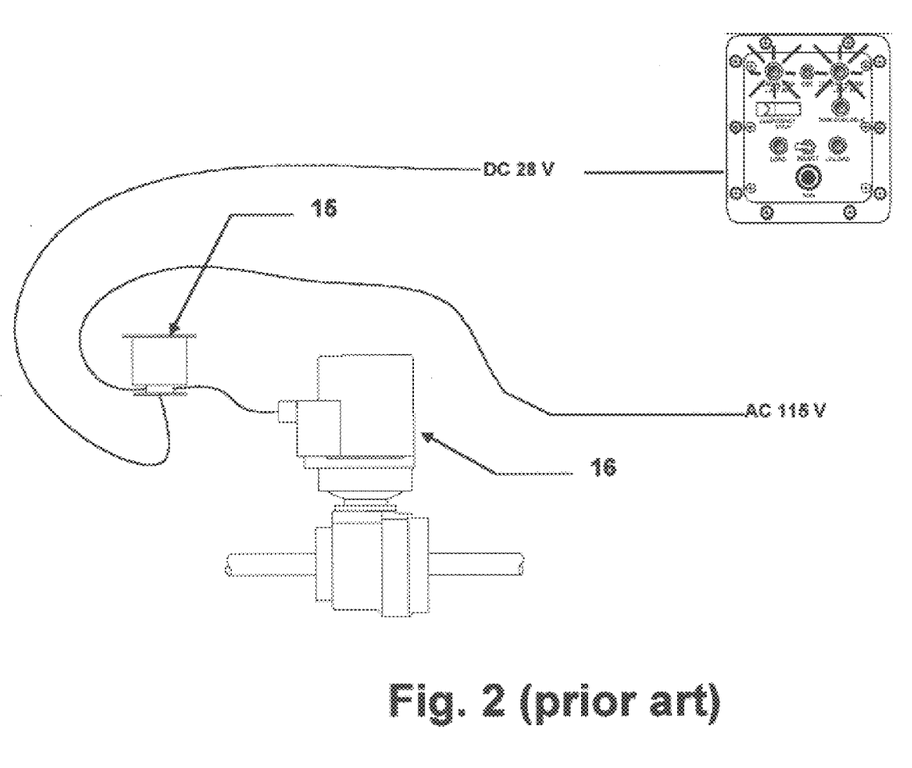
FIG. 2 shows the prior art electrical wiring for controlling the operation of an actuator unit of a loading conveyor.

The wiring of a typical prior art conveyor is shown in FIG. 2. The operator maneuvers the conveyor via a maneuver panel which transmits an actuator signal to a relay (15) which in turn determines if the actuator unit (16) is to be fed with the electric power or not. If something gets stuck, the release connections are released or the electric fuses are blown or released.

Maximum load is however very seldom reached for the reasons below:

The motor is dimensioned for use in different models and lengths (i.e. baggage weights) of the loading system; thus the motor is in many cases overdimensioned in respect of the maximum load of the actual sliding carpet system in which the motor is installed.

In many cases the maximum allowed baggage weight is not utilized, even when the cargo compartment of the airplane is fully loaded.

As loading and unloading is made step by step, only the inner step carries full load. Thereafter the load on the actuator is reduced down to zero at the last step.

This means that the actuator in most loading cases has a considerably larger pulling (i.e. torque) capacity than necessary. However, it must of course stand up to the maximum load at the innermost loading and unloading step, by which the sliding carpet system carries maximum load derived from the baggage weight.

The problem is that if the loading system hits some kind of stop, for example if the cargo net is not properly removed or if some baggage gets stuck, the electric fuses and the release connections as the bulkhead usually are not released fast enough, and they are in many cases overdimensioned in order to meet the maximum load requirements. Therefore, there is a risk that the loading conveyor with the sliding carpet system damages the baggage that gets stuck, or even gets damaged itself, whenever the loading conveyor is used with a load less than the maximum load. Furthermore every problem with damaged baggage or damaged loading conveyors leads to time consuming repairs or manual loading and unloading.

Another problem associated with known loading conveyors of the above mentioned type is incorrect operation of the loading conveyor by the operator. For instance, it is not that unusual that the operator maneuvers the loading conveyor in the unloading direction and lets the loading conveyor and the rear wall push the bags out of the loading compartment instead of lifting off the bags and maneuver the loading conveyor stepwise. Since the electrical wiring is dimensioned on the basis of the maximum load usually takes some time before the loading conveyor is stopped even if something gets stuck, when the loading conveyor is incorrectly operated. If something gets stuck it is usually the rear wall that is released, which means that the complete loading compartment must be unloaded manually and then the release connections of the rear wall must be reset. This manual unloading and reconnection of the release connections are quite time consuming.

In the field of air traffic, the time on the ground must be minimized to make a profit on the very costly investments of buying the planes and building the airports.

In the field of air traffic, the time on the ground is almost always determined by the time required for refueling, safety check and similar flight critical factors. It is never acceptable that the baggage loading system takes more time than the flight critical measures taken on the ground.

Thus it is not acceptable that the loading conveyor must be unloaded manually if something temporarily gets stuck or if the loading conveyor is incorrectly used.

SUMMARY OF THE INVENTION

Thus, an object of the invention is to eliminate or at least diminish the risk that a loading conveyor damages its environment, the cargo, the operator or itself if something gets stuck.

Another object of the invention is to prevent the operator from damaging the loading conveyor or its environment by incorrect operation of the sliding carpet system.

Another object is to reduce the time required to get the loading conveyor back in use after something has been temporarily stuck or after it has been incorrectly used.

These objects are achieved with a method for controlling the operation of an actuator unit, comprising the steps:

a) repeatedly reading the current fed to the actuator unit, b) making a first comparison, wherein the readings are compared with a first maximum level and, if the readings are above said maximum level a number of times exceeding a maximum level stop number, the electric power fed to the actuator unit is cut off, c) making a second comparison, wherein two successive readings repeatedly are compared with each other and, if the differences between the readings are below a first ramp level a number of times exceeding a steady state counter number, a steady state condition for the current fed to the actuator unit is detected.

d) if steady state is detected, setting at least one overload detection limit on the basis of at least one steady state reading of the current fed to the actuator unit.

By initially comparing the current with the maximum level and detecting steady state and finally setting one or more overload detection limits on the basis of the steady state current, the method manages to control an actuator unit with varying load conditions and still cut the power fast enough if something gets stuck. Even if the actuator unit drives, for instance, a conveyor with a load far from the maximum load of the conveyor the method cuts the power, not seldom long before the ordinary fuses or circuit breakers of known type are released, if something gets stuck.

According to a preferred embodiment of the inventive method, the method further comprises a step: e) making a third comparison, wherein the readings repeatedly are compared with a soft maximum level set on the basis of said steady state reading of the current and, if the reading exceeds said soft maximum level a number of times exceeding a soft maximum stop level number, the power fed to the actuator unit is cut off.

By setting a soft maximum level, the method cuts the power if the current slowly increases over a longer period of time. This might be the case when something begins to get stuck and the problem in question propagates but a real stop has not yet come up.

According to a preferred embodiment of the inventive method, the method further comprises a step: f) making a fourth comparison, wherein consecutive readings repeatedly are compared with each other and, if the differences between the readings repeatedly are above a second ramp level, the electric power fed to the actuator unit is cut off.

By comparing the readings with each other like this the method cuts the power even if a maximum level has not been reached. This means that if something gets stuck hard, the actuator unit is stopped almost immediately.

According to a further preferred embodiment of the inventive method, the first comparison step comprises the steps of comparing the readings with a first predetermined maximum level and, if the readings consecutively are above said maximum level a number of times exceeding a predetermined maximum level stop number, cutting the electric power fed to the actuator unit.

With this embodiment the quality of the method is increased, i.e. the method cuts the power more accurately in situations where the power is meant to be cut and does not cut the power when it is not meant to be cut.

According to a further preferred embodiment of the inventive method, the second comparison step comprises the steps of repeatedly comprising two consecutive readings with each other and, if the differences between the readings consecutively are below a first predetermined ramp level a number of times exceeding a predetermined steady state indicating level, detecting a steady state condition for the current fed to the actuator unit.

Also with this embodiment the quality of the method is increased, i.e. the method cuts the power more accurately in situations where the power is meant to be cut and does not cut the power when it is not meant to be cut.

According to a further preferred embodiment of the inventive method, the fourth comparison step comprises the steps of repeatedly comparing consecutive readings with each other and, if the differences between the readings are above a second predetermined ramp level a number of times exceeding a predetermined ramp indicating level cutting the electric power to the actuator unit.

With this embodiment the quality of the method is increased, i.e. the method cuts the power more accurately in situations where the power is meant to be cut and does not cut the power when it is not meant to be cut.

According to a further preferred embodiment of the inventive method, the soft maximum level is updated on the basis of the steady state readings of the current fed to the actuator unit.

With the embodiment the method takes into consideration any expected increase or decrease of the current during the period of time the actuator unit is activated. By updating the soft maximum level, the soft maximum level can be set closer to the actual reading of the steady state current and the accuracy of the method is increased.

According to a further preferred embodiment of the inventive method, the current fed to the actuator unit is read by way of a non-contacting method.

By using a non-contacting way of reading the current, it is easier to install a device incorporating the method in an existing installation.

According to a further preferred embodiment of the inventive method, the reading is conducted with a meter responding to the electromagnetic field around an electrical wire by which the actuator unit is fed with electrical power.

This is a safe and certain way of non-contractingly determining the current fed to the actuator unit.

The objects of the invention are also achieved with a device, for controlling the operation of an actuator unit, comprising:

an electrical current meter, repeatedly reading a current fed to an actuator unit, a processing unit, which on one hand compares the readings with a maximum level and on the other hand compares the readings with each other and outputs a signal whether the actuator unit should be fed with electric power or not, and an electrical switch, which receives the signal from the processing unit and relays or cuts off the electric power to the actuator unit.

By using a device of this type the behavior of the actuator unit is measured by the meter and taken into consideration in the processing unit and then controlled by the switch. By measuring the behavior of the actuator unit, limit values for the actuator unit can be set on the basis of different load situations and different behavior of the actuator unit and the environment driven by or otherwise influencing the actuator unit. This adaptive way of setting limits makes it possible for the device to cut the power to the actuator unit if something gets wrong, even if the maximum load of the actuator unit is not reached. This device controls the actuator unit even at loads far from the maximum load. The adoptively set limits can be much closer to the actual load situation than limits set on the basis of the maximum load, which means that the actuator unit is stopped if something goes wrong irrespectively whether the maximum load is reached or not.

According to a preferred embodiment of the inventive device, said signal-receiving electrical switch maneuvers a relay which maneuvers the actuator unit.

By using a two stage switching of the power, the risk of burning or damaging the device is highly diminished. The switch is maneuvered by a signal from the processing unit and transmits a signal of moderate voltage to the relay which in turn maneuvers electric drive power which often is too high for the first electric switch to handle. The choice of combinations of switches and relays is of course highly dependent on the environment in which the device is meant to be installed.

According to a preferred embodiment of the inventive device, the meter is a non-contacting meter, preferably an inductive meter reading the electromagnetic field around at least one of the conductors feeding the actuator unit with electric power.

According to a preferred embodiment of the inventive device, the meter, the processing unit and said signal-receiving switch are integral in a unit.

By integrating said components to an integral unit, installation and manufacture are highly facilitated.

The objects of the invention are also achieved with a conveyor incorporating a device, controlling the operation of an actuator unit of the loading conveyor, the device comprising:

an electric current meter, repeatedly reading a current fed to an actuator unit, a processing unit, which on one hand compares the readings with a predetermined value and on the other hand compares the readings with each other and outputs a signal whether the actuator unit should be fed with electric power or not, and a relay, which receives the signal from the processing unit and relays or cuts off the electric power to the actuator unit.

By using a device of said type in a conveyor, the safety of the operator, the load and the conveyor itself is highly enhanced. By using a device of this type the behavior of the actuator unit and thus the conveyor is measured by the meter and taken into consideration in the processing unit and then controlled by the switch. By measuring the behavior of the actuator unit, limit values for the actuator unit can be set an the basis of different load situations and different behavior of the actuator unit and the environment driven by or otherwise influencing the actuator unit. This adaptive way of setting limits makes it possible for the device to cut the power to the actuator unit if something gets wrong, even if the maximum load of the actuator unit is not reached. This device controls the actuator unit even at loads far from the maximum load. The adoptively set limits can be much closer to the actual load situation than limits set an basis of the maximum load, which means that the actuator unit is stopped if something goes wrong irrespectively of whether the maximum load is reached or not.

It should be noted that the features of the preferred embodiments of the inventive method and the inventive device can be combined in any desired way.

BRIEF DESCRIPTION OF THE DRAWINGS

The invention will be described in more detail with reference to the appended schematic drawings, which show an example of a presently preferred embodiment of the invention.

DESCRIPTION OF PREFERRED EMBODIMENTS

The preferred embodiment of the invention concerns a device 10 for controlling a loading conveyor 1 for loading a cargo compartment, in particular that of an aircraft fuselage. An example of such loading conveyor or sliding carpet system is described in U.S. Pat. No. 4,984,756 (Helmner), which hereby is incorporated by reference.

Figure 1:
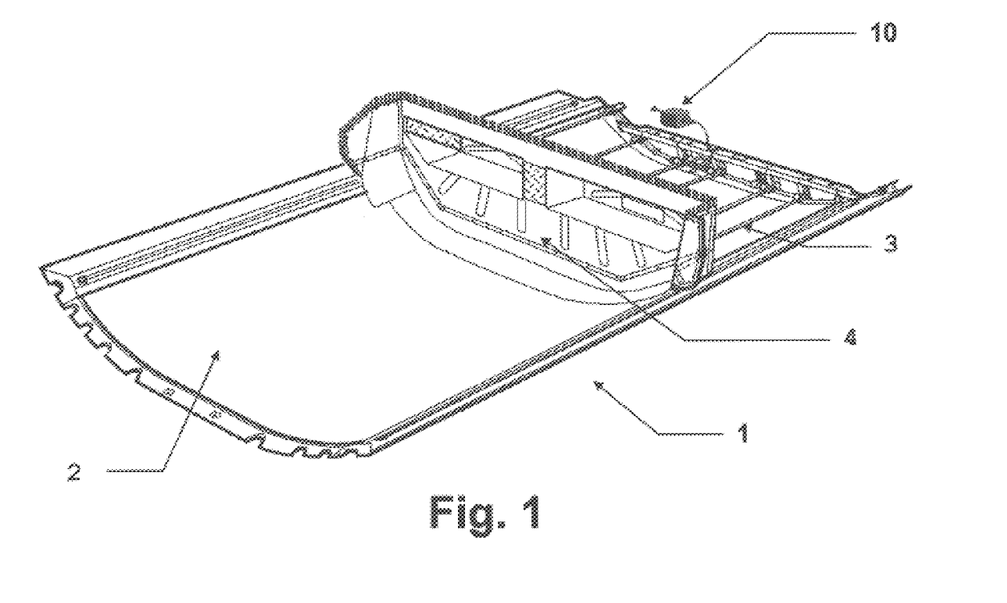
FIG. 1 shows the body and the rear wall of the loading conveyor where the inventive device for controlling the operation of an actuator unit of the loading conveyor is adapted to be placed according to a preferred embodiment.

With reference to FIG. 1, the loading system 1 is located beneath the passenger cabin and comprises a carpet-like conveyor 2, driven by an actuator unit 16 (not shown in FIG. 1 but located beneath the framework of the cargo loading system near the most rearward end of the framework) via belts 3 connected to the conveyor 2. A rear cargo wall 4 is fixed to the belts 3 and provides a rear stowage room limit.

The loading system is used in the loading mode as follows:

The actuator unit 16 is activated and drives the rear wall 4 and the loading conveyor 2 to the front of the loading system.

One layer of suitcases or similar cargo is put down on the carpet-like conveyor 2.

The actuator unit 16 is activated and drives the conveyor 2 and the rear wall 4 about half a meter backwards.

A new layer of cargo is put down on the conveyor 2 and the actuator unit 16 and this procedure is repeated stepwise until the conveyor 2 is fully loaded, i.e., the rear wall 4 is at its most rearward position.

When the loading conveyor is to be unloaded the procedure is performed the other way around. The loading conveyor is stepwise unloaded and stepwise driven by the actuator unit 16 until it is completely emptied, i.e., the rear wall 4 is in its most forward position.

The actuator unit 16 (motor and gearbox) of the sliding carpet system typically consists of a three-phase electrical asynchronous motor connected to a reduction gear, e.g. a planet reduction gear. The rotational speed and torque of the actuator is dimensioned to handle/stand up to the highest specified baggage weight (maximum load) of the loading system. Also the electric system is dimensioned on the basis of the maximum current consumption required by the actuator (asynchronous motor) at this maximum load.

The motor is protected by electric fuses or circuit breakers, which are blown or released at too high current, i.e. if the motor torque exceeds the maximum load. The fuses that protect the motor, the electric cables and other electric components are dimensioned on the basis of maid maximum load of the conveyor. To protect the mechanical components, the movable bulkhead has release connections, which are released if the bulkhead hits a stop.

The actuator (motor and gearbox) of the preferred embodiment of the sliding carpet system consists of a three-phase asynchronous motor which is connected to a planet reduction gear with a gear ratio of 287:1. The maximum rpm/torque from the actuator is between 600 and 850 Nm depending on model.

Figure 3:
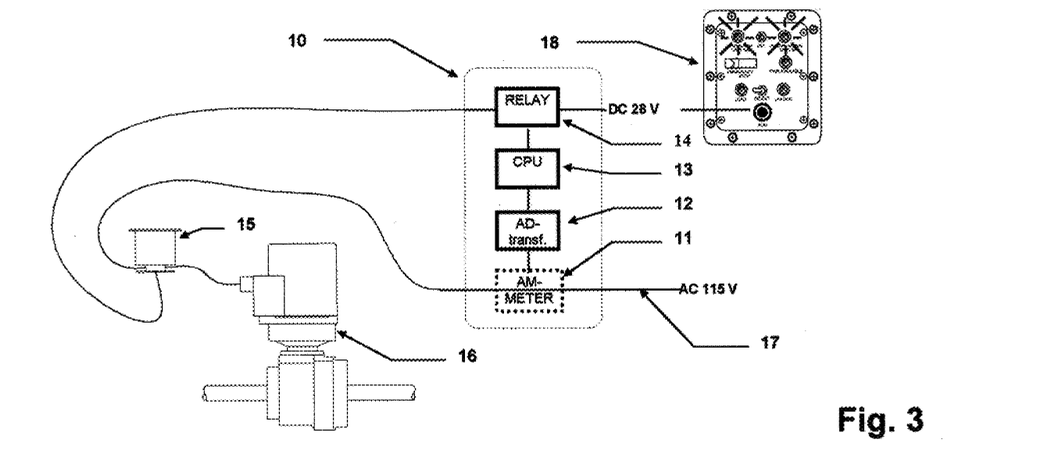
FIG. 3 shows the electrical wiring for controlling the operation of an actuator unit of a loading conveyor according to a preferred embodiment of the invention.

As can be seen in FIG. 3 the device 10 for controlling the actuator unit 18 of the loading conveyor 1 comprises an AM-meter 11 (ampere meter) which reads the current fed to the actuator unit 16. The AM-meter 11 surrounds one (or more) of the three separately electrically insulated conductors 17 of the electrical wiring through which the actuator unit 16 is fed with electric power. The meter 11 is not electrically connected with said conductor 17, but reads the current electromagnetic field around the conductor 17 inductively with a coil. The analog signal of the coil of the AM-meter 11 is transmitted to an AD-transformer 12. The AD-transformer 12 transforms the analog signal to a digital signal. The digital signal is transmitted to a CPU (central processing unit) 11 in which the digitally transformed signal which corresponds to the current fed to the actuator unit 16 is evaluated as will be described below. On the basis of the evaluation of the CPU 13 a signal is transmitted to a low current relay 14. The signal receiving low current relay 14 is connected in the wiring between the operator's maneuver panel 18 and a driving current relay 15 installed between the electric power source (not shown) and the actuator unit 16. The AM-meter 11, the AD-transformer 12, the CPU 13 and the low current relay 14 are integrally formed on a circuit board in a so-called current control unit 10.

The evaluation method of the CPU 13 will now be described in more detail with reference to FIGS. 4A and 4B in which a schematic block diagram is shown.

When an operator activates the loading conveyor 1 the first check is whether it is the load direction or the unload direction that is the desired direction. If the load direction is required, the CPU checks whether the load direction is locked by the overload protection or not and, if the unload direction is desired, the CPU checks whether the unload direction is locked by the overload protection or not. If the direction in question is locked, the loading conveyor system can only be driven in the reversed direction.

When the operation activates the actuator unit in an unlocked direction, the current fed to the actuator unit 16 through said one or more conductors is read twice with a certain time (0.1 s) lapsed between readings. If the latest reading is below a first level (named MAXL: Max Limit Value in the block diagram) a max limit counter (MAXLC: Max Limit Counter) is set to be zero. If the latest reading is above said first level, said mix limit counter is increased by one.

If the max limit counter reaches a number above a max limit counter stop value (MAXLCS: Max Limit Counter Stop), overload is detected and the signal receiving relay 14 is maneuvered to cut the power through said relay 15, and thus the actuator unit 16 is stopped.

As the max limit counter is set to be zero if a reading is below said first level, the readings must have been consecutively above said first level a number of times exceeding said max limit counter stop value if overload has been detected.

If said max limit counter stop does not result in an overload detection, the two readings are compared with each other. If the difference between the readings is above a first ramp level (SoRLSa: Steady o Ramp Limit Step a), a steady state counter (SSC: Steady State Counter) is set to be zero. If the difference between the readings is below said first ramp level (SoRLSa), the steady state counter (SSC) is increased by one.

As long as the steady state counter (SSC) is below a steady state counter stop (SSCS) the procedure is repeated from the top; the program checks if the system is activated in a non-locked direction and checks the readings in respect of said first level.

When the steady state counter (SSC) reaches the steady state counter stop (SSCS), steady state is considered detected and the program advances to a new module.

As the steady state counter (SSC) is set to be zero if two compared readings differ more than said first ramp level (SoRLSa), the difference between the readings must consecutively be below said first ramp level (SoRLSa) a number of times equal to the steady state counter stop (SSCS) value.

If steady state is detected, the first check is to see if the system is locked by an overload detection in one direction. If this is the case, the next check is to see if the loading conveyor system has been reversed more than two seconds. If this in turn is the case, the overload break for the direction in question (i.e. the direction opposite to the direction in which the conveyor runs) is reset and the twinkling or flashing alarm lamps stop twinkling. If the system is not locked in any direction or if the system has not been reversed more than two seconds, the overload reset is not performed.

The next step in the steady state module of the block diagram is to read a new value of the current fed to the actuator unit 16.

From this reading of the current a normalized or updated steady state value (StSt) is determined, using a factor (FT: Filtertime). In this normalization the steady state value used for setting said steady state overload limits is updated if the load of the actuator unit increases. The updating of the steady state value leads to an update of the soft limit, i.e. an increase of the soft limit. However, the increase of the soft limit is such that the soft limit increases only a few percent of the increase of the steady state reading, which means that the soft limit will not be updated such that the overload will not be detected.

From this calculated steady state value a soft limit (Soft Limit) is calculated. The soft limit is defined as the last reading multiplied by a predetermined soft limit factor (SoftLF: Soft Limit Factor). According to an alternative the soft limit is defined as the last reading added with a predetermined soft limit factor.

Next the difference between the second last and third last reading is compared with said first ramp level (SoRLSa). If the difference is above said first ramp level (SoRLSa), the last reading and the second last reading is compared. If the difference is above a second ramp level (RLSB: Ramp Limit Step b), overload is detected and power to the actuator unit is cut by the relays 14, 15.

If the difference between said second last and said third last reading is below said first ramp level (SoRLSa), the comparison with the second ramp level (RLSb) is not performed.

If the ramp level checks have not led to an overload detection, the last reading is compared with said soft limit and if the reading is above or equal to said soft limit, overload is detected.

As long as the run button remains activated by the operator, the steady state module (i.e. the part illustrated in FIG. 4B) of the block diagram is repeated. If the operator releases the run button, the program sets all counters to be zero and returns to the first check, i.e., the check if the run button is activated or not.

Practically the method can be performed in the CPU 13, for instance, with computer software.

Figure 4A:
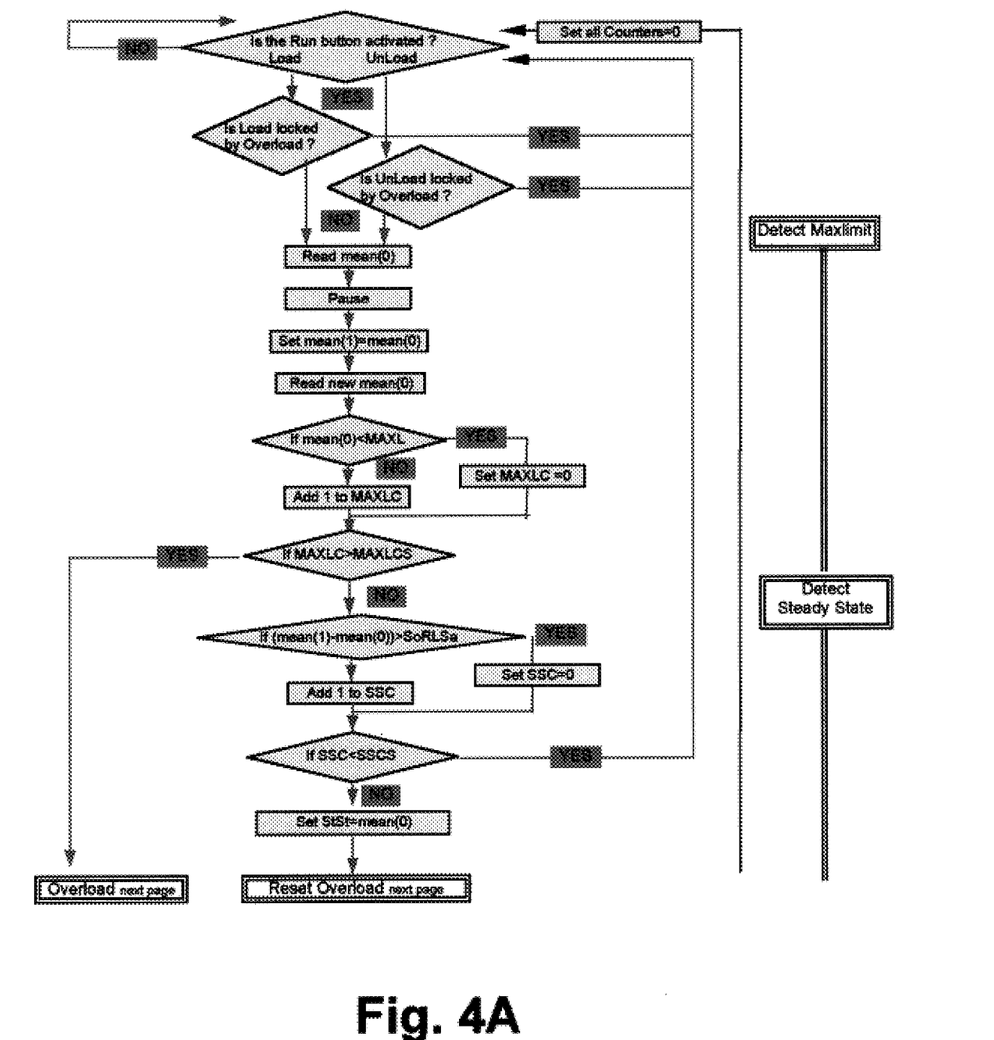
FIGS. 4A and 4B show a schematic block diagram of a preferred embodiment of the method according to the invention.
Figure 4B:
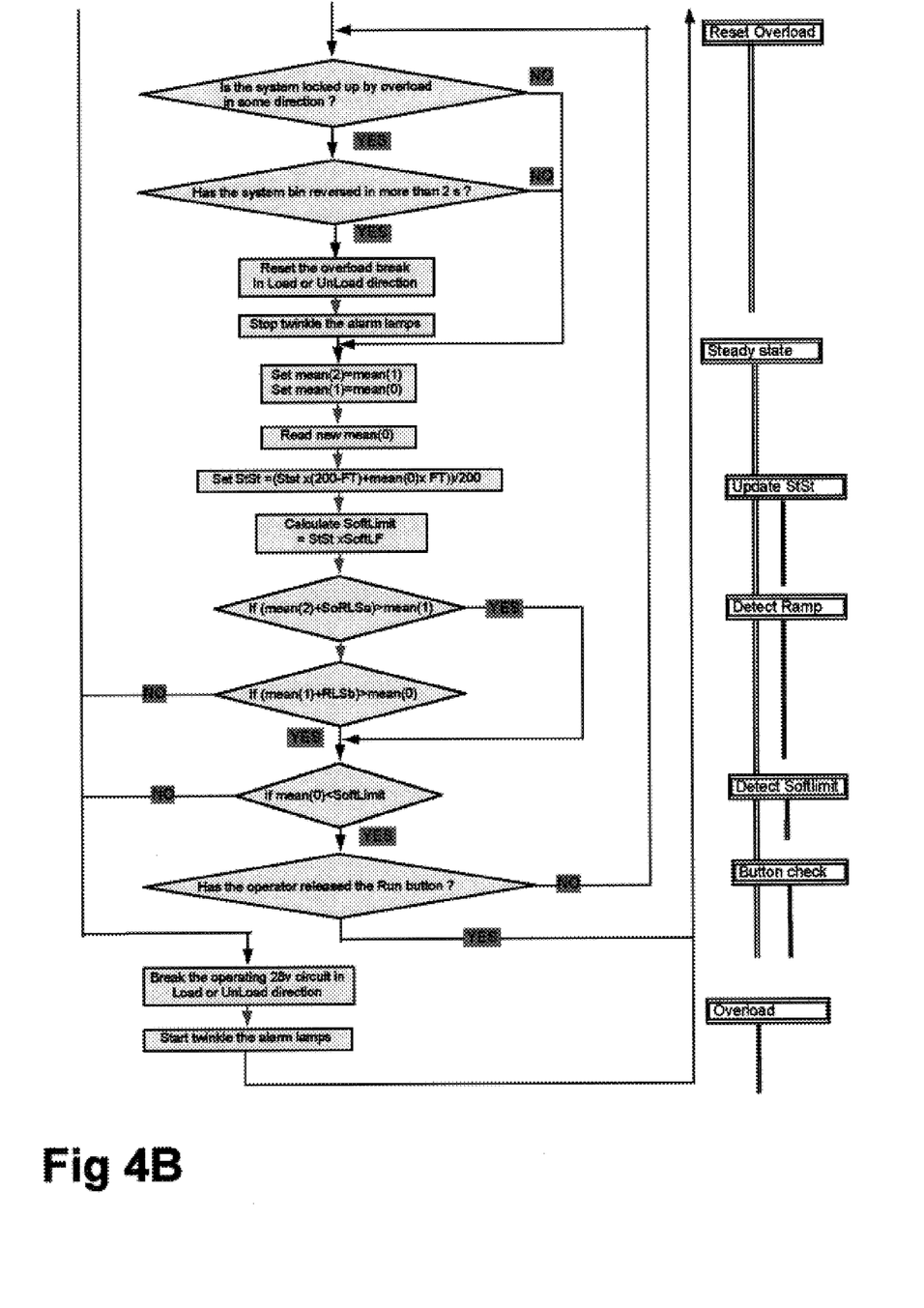

Of course the comparisons with the unequal signs as illustrated in the block diagram of FIGS. 4A and 4B can be changed in correlation with the steady counter stop values as long as the meaning is the same. The formulations of the comparisons in the block diagram are presently preferred but are not the only ones that will give the desired result.

Figure 5:
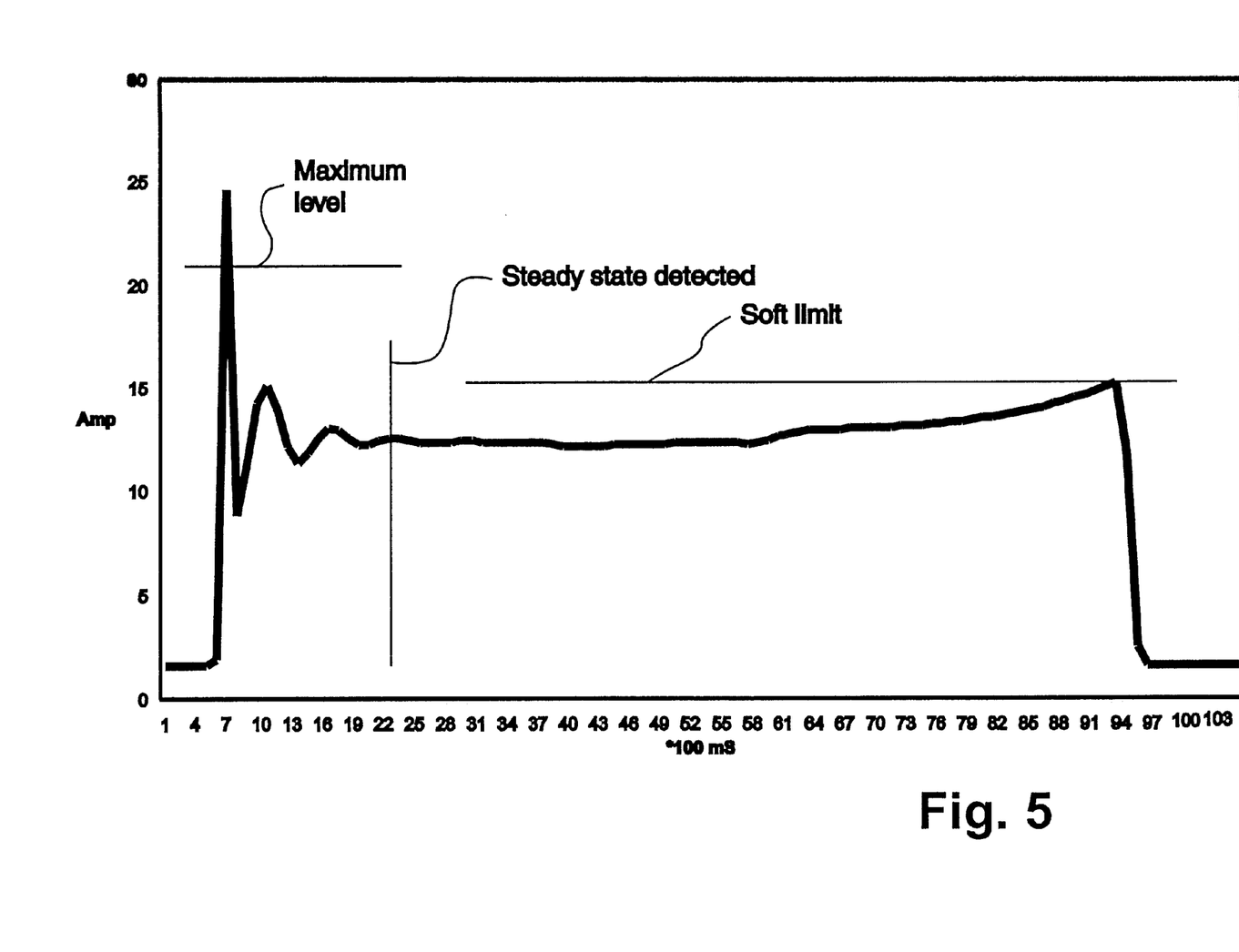
FIG. 5 shows the current fed to an electric motor of an actuator unit over time during one sequence.

FIG. 5 shows a typical sequence of the current, fed to the actuator unit 16 via one of the conductors 17, over time. Initially the current oscillates considerably due to the elasticity and the inertia of the system. In this period of time the current is compared with said first maximum level (MAXL) as described above.

After a while the oscillations decline and steady state is detected. After steady state is detected, said soft limit (Soft Limit) is calculated on the basis of a reading of the current.

The last peak of the current shows how the current could increase if something gets stuck. As steady state has been detected, the readings for the current are compared with said soft limit and the readings are compared with each other as described above. If one of the readings exceeds the soft limit or if the increase of the readings is too high the CPU transmits a signal to the signal-receiving relay 14 which in turn maneuvers a driving current relay is installed between the electrical power source (not shown) and the actuator unit 16.

The exact values of the parameters in the block diagram are to be chosen in view of the load characteristics of the conveyor in question. According to the preferred embodiment the MaxLSC=3; SoftLimitFactor=1,09; and SSSCS=4, in view of the sample time 0,1s.

As can be seen in FIG. 5, the current (and thus the load on the release connections) is much lower when the power is cut than when the conveyor is started. Furthermore the current at the initial step, during the steady state step, can be much higher than shown in FIG. 5 if the conveyor is loaded with more baggage or other cargo.

It should be noted that modifications to the described embodiments of the invention are possible within the scope of the invention, being defined in the claims.

What we claim and desire to secure by Letters Patent is:

1. A method for controlling the operation of an actuator unit, comprising the steps of:
    a) repeatedly reading a current fed to the actuator unit to obtain readings,
    b) making a first comparison wherein the readings are compared with a first maximum level and, if the readings are above the maximum level a number of times exceeding a maximum level stop number, cutting off the electric power fed to the actuator unit,
    c) making a second comparison wherein two successive readings repeatedly are compared with each other and, if differences between the readings are below a first ramp level a number of times exceeding a steady state counter number, detecting a steady state condition for the current fed to the actuator unit, and
    d) if a steady state is detected, setting at least one overload detection limit on a basis of at least one state reading of the current fed to the actuator unit.

2. A method according to claim 1, further comprising a step of:
    e) making a third comparison wherein the readings repeatedly are compared with a soft maximum level set on basis of at least one steady state reading of the current and, if the reading exceeds the soft maximum level a number of times exceeding a soft maximum stop level number, cutting off the electric power fed to the actuator unit.

3. A method according to claim 1, further comprising a step of:
    e) making a third comparison wherein consecutive readings repeatedly are compared with each other and, if a difference between the readings repeatedly are above a second ramp level, cutting off the electric power fed to the actuator unit.

4. A method according to claim 1, wherein the first comparison step comprises the steps of comparing the readings with a first predetermined maximum level and, if the readings consecutively are above the maximum level a number of times exceeding a predetermined maximum level stop number, cutting the electric power fed to the actuator unit.

5. A method according to claim 1, wherein the second comparison step comprises the steps of repeatedly comparing two consecutive readings with each other and, if differences between the readings consecutively are below a first predetermined ramp level a number of times exceeding a predetermined steady state indicating a level, detecting a steady state condition for the current fed to the actuator unit.

6. A method according to claim 3, wherein the third comparison step comprises the steps of repeatedly comparing consecutive readings with each other and, if differences between the readings are above a second predetermined ramp level a number of times exceeding a predetermined ramp indicating level, cutting the electric power fed to the actuator unit.

7. A method according to claim 1, wherein a soft maximum level is updated on a basis of the steady state readings of the current fed to the actuator unit.

8. A method according to claim 1, wherein the current fed to the actuator unit is read by way of a non-contacting method.

9. A method according to claim 8, wherein the reading is conducted with a meter responding to the electromagnetic field around an electrical wire by which the actuator unit is fed with electric power.

10. A device for controlling the operation of an actuator unit, comprising:
    an electrical current meter, repeatedly reading a current fed to the actuator unit to obtain readings,
    a processing unit, which on one hand compares the readings with a maximum level and on the other hand compares the readings with each other and outputs a signal whether the actuator unit should be fed with electric power or not, and
    an electrical switch, which receives the signal from the processing unit and relays or cuts off the electric power to the actuator unit, and
    wherein the processing unit performs a comparison, wherein two successive readings repeatedly are compared with each other and, if the differences between the readings are below a first ramp level a number of times exceeding a steady state counter number, a steady state condition for the current fed to the actuator is detected.

11. A device according to claim 10, wherein the signal-receiving electrical switch maneuvers a relay which maneuvers the actuator unit.

12. A device according to claim 10, wherein the meter is a non-contacting meter.

13. A device according to claim 10, wherein the meter, the processing unit and the signal-receiving switch are integral in a unit.

14. A device according to claim 10, wherein the processing unit repeatedly receives a reading of the current fed to the actuator unit.

15. A device according to claim 10, wherein the processing unit performs a second comparison, wherein the readings are compared with a first maximum level and, if the readings are above the maximum level a number of times exceeding a maximum level stop number, the electric power fed to the actuator unit is cut off.

16. A device according to claim 10, wherein the processing unit, if a steady state is detected, sets at least one overload detection limit on a basis of at least one steady state reading of the current fed to the actuator unit.

17. A device according to claim 16, wherein the processing unit performs a second comparison, wherein the readings repeatedly are compared with a soft maximum level set on a basis of at least one steady state reading and, if the reading exceeds the soft maximum level a number of times exceeding a soft maximum stop level number, the electric power fed to the actuator unit is cut off.

18. A device according to claim 17, wherein the processing unit performs a third comparison wherein consecutive readings repeatedly are compared with each other and, if differences between the readings are above a second ramp level a number of times exceeding a ramp level stop number, the electric power fed to the actuator unit is cut off.

19. A device according to claim 15, wherein the second comparison step performed by the processing unit comprises the steps of comparing the readings with a first predetermined maximum level and, if the readings consecutively are above the maximum level a number of times exceeding a predetermined maximum level stop number, the electric power fed to the actuator unit is cut.

20. A device according to claim 10, wherein the comparison step performed by the processing unit comprises the steps of repeatedly comparing two consecutive readings with each other and, if differences between the readings consecutively are below a first predetermined ramp level a number of times exceeding a predetermined steady state indicating level, detecting a steady state condition for the current fed to the actuator unit.

21. A device according to claim 18, wherein the third comparison step performed by the processing unit comprises the steps of repeatedly comparing consecutive readings with each other and, if differences between the readings are above a second predetermined ramp level a number of times exceeding a predetermined ramp indicating level, the electric power fed to the actuator unit is cut off.

22. A device according to claim 17, wherein the soft maximum level set by the processing unit is updated on a basis of the steady state readings of the current fed to the actuator unit.

23. A loading conveyor comprising a device for controlling the operation of an actuator unit, comprising:

an electric current meter, repeatedly reading a current fed to the actuator unit to obtain readings, a processing unit, which on one hand compares the readings with a maximum level and on the other hand compares the readings with each other and outputs a signal whether the actuator unit should be fed with electric power or not, and an electrical switch, which receives the signal from the processing unit and relays or cuts off the electric power to the actuator unit, and wherein the processing unit performs a comparison, wherein two successive readings repeatedly are compared with each other and, if the differences between the readings are below a first ramp level a number of times exceeding a steady state counter number, a steady state condition for the current fed to the actuator is detected.

\* \* \* \* \*